Nov. 7, 1944.   D. SILVERMAN   2,362,164
RADIOACTIVITY LOGGING
Filed April 11, 1942   2 Sheets-Sheet 1
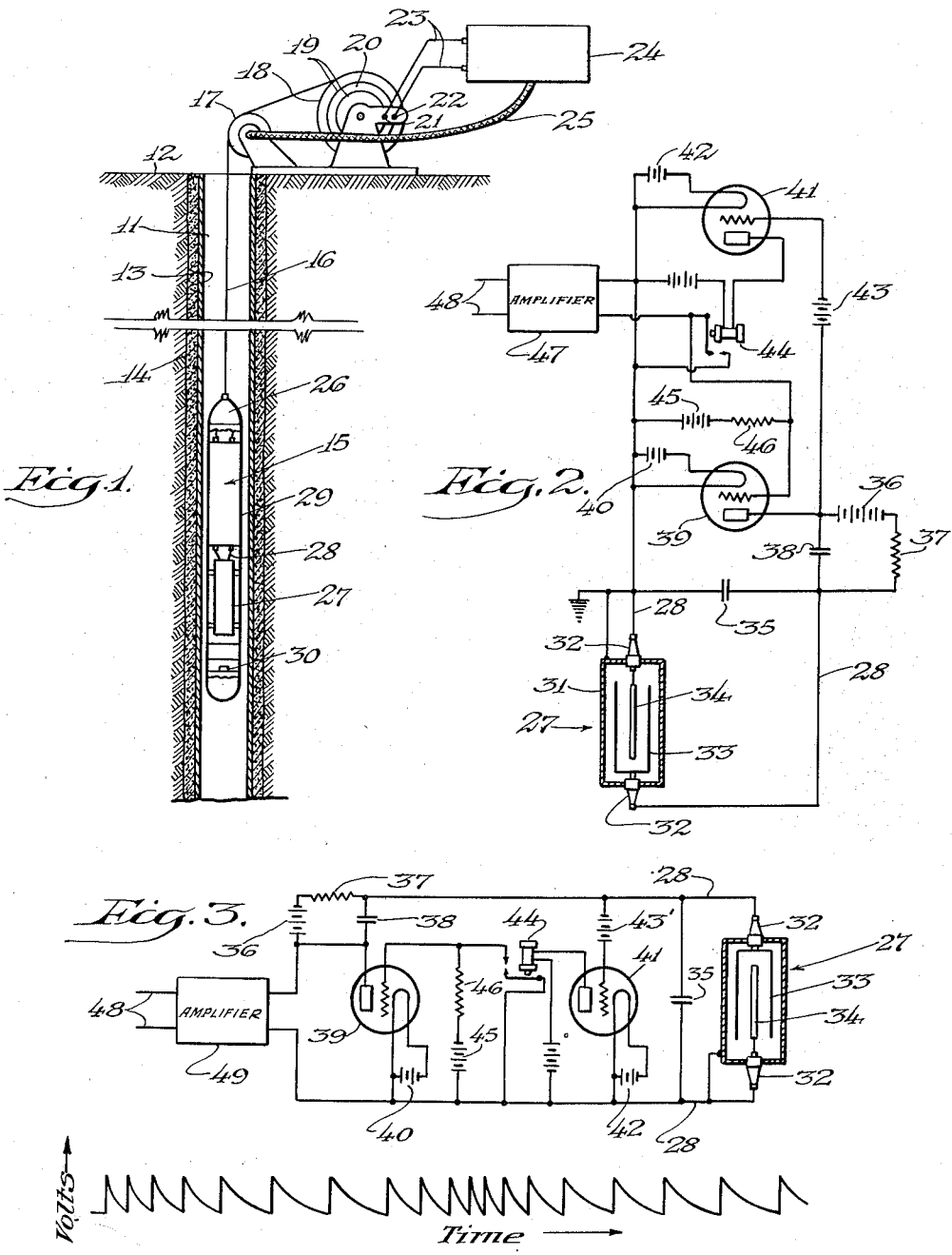

Nov. 7, 1944.    D. SILVERMAN    2,362,164
RADIOACTIVITY LOGGING
Filed April 11, 1942    2 Sheets-Sheet 2

Inventor:
Daniel Silverman
By Paul F Hawley
Patent Agent

Patented Nov. 7, 1944

2,362,164

UNITED STATES PATENT OFFICE 2,362,164

RADIOACTIVITY LOGGING

Daniel Silverman, Tulsa, Okla., assignor to Stanolind Oil and Gas Company, Tulsa, Okla., a corporation of Delaware Application April 11, 1942, Serial No. 438,644

11 Claims. (Cl. 250—83.6)

This invention pertains to an improvement in the art of radioactivity well logging. More particularly this invention pertains to methods and means for the improved transmission of the desired information from the point of radioactivity measurement to the point at which the resultant record is made.

In the determining of the location and extent of various strata encountered in a well, it has been found advantageous to employ a measurement of radioactivity of the formations as a function of the depth of the well. Two advantages of such a procedure are, first, that the measurements are to a great extent unaffected by the amount of drilling fluid present and the previous history of the drilling of the well and, second, that if only the more penetrating radiation from radioactive formations, such as gamma radiation, is logged, the measurements may be made in a cased well as well as in an uncased well, thus avoiding one difficulty present when wells are logged by a resistivity method. There is, however, a great deal of difficulty encountered in making such a radioactivity log in that the instrument used to detect the amount of radioactive emanations produces a very weak signal which is subject to a great deal of distortion as it is transmitted to the surface due to such factors as the electrical leakage between conductors of logging cables. The leakage, which is variable, may entirely mask the desired signal causing errors in interpretation of the resultant log.

I have found that it is possible to eliminate such difficulties and secure a log of the relative radioactivity of the various formations encountered in a well with little or no effect upon the resultant record of the leakage of the cable. This is accomplished by the use of an ionization chamber in the well, across which is applied a varying potential, the rate of variation of which depends upon the ionization in the chamber which in turn is due to the radioactivity of the adjacent formations. The varying potential is preferably amplified, transmitted to the surface, and recorded, usually as a function of depth. It is, therefore, an object of this invention to provide a method and apparatus for determining the relative radioactivity of formations in a well as a function of depth in which a varying potential is applied to an ionization chamber lowered into said well and the variations of said potential are recorded as a function of depth. A second object of my invention is the provision of a method and apparatus by means of which a pulsating signal is produced at a varying frequency, the frequency being directly related to the amount of radioactivity of the various formations encountered and in which the frequency is recorded as a function of depth. A further object of this invention is to provide a method and means for checking the response of a system responsive to the radioactivity emanating from the walls of a well bore whereby a calibration of the system can be made whenever desired. Further objects and advantages of this invention will be seen upon perusal of this specification.

In general I produce the desired results by lowering an ionization chamber containing an inert gas under superatmospheric pressure into the well, periodically charging a condenser associated with the ionization chamber to a predetermined potential, periodically discharging the condenser through the ionization chamber and measuring a quantity relating to the rate of discharge of the condenser through the ionization chamber, which quantity is suitable for amplification and recording without being appreciably affected by the variable leakage in the logging cable or other disturbing effects.

In order to explain the operation of this system more completely, certain drawings are attached hereto and made a part hereof which illustrate various embodiments of my invention. It is apparent that these drawings are merely for the purpose of illustration and that other embodiments can be easily produced in accordance with the teaching of this specification. In these drawings the same reference numeral in different figures refers to the same or a corresponding part.

Figure 1 is a cross section in diagrammatic form of a well bore in which the logging instrument is located, showing the basic apparatus used to carry out the invention;

Figure 2 is a wiring diagram of one arrangement of apparatus which can be employed in a well in accordance with my invention;

Figure 3 is a wiring diagram of a second arrangement of apparatus for producing a signal proportional to the radioactivity of the formations in the well;

Figure 4 is a graph of the voltage-time relationship in the signal put out from the apparatus shown in Figure 2 or 3;

Figure 5:
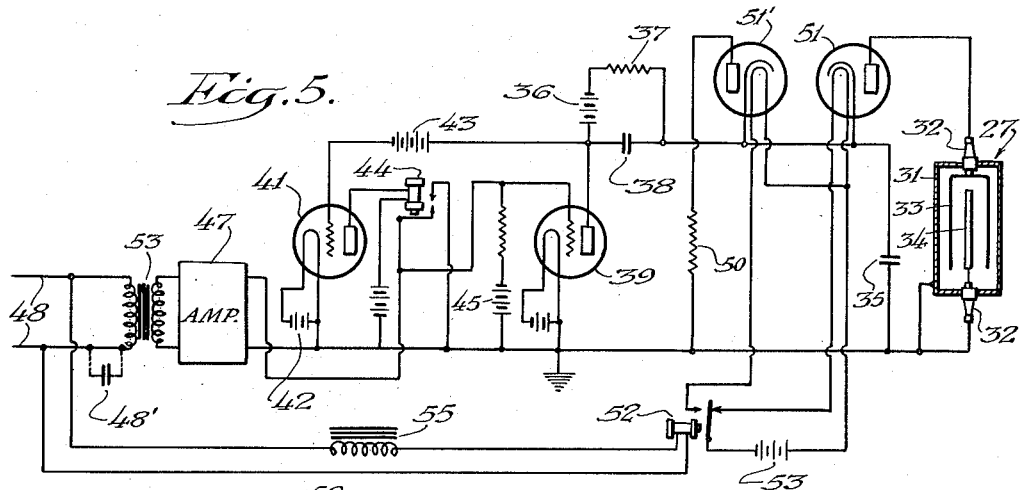
Figure 5 is a wiring diagram of apparatus used in the well in conjunction with the ionization chamber for measuring the radioactivity and for calibrating the equipment used in the well whenever desired.

In Figure 1 a well 11 has been drilled from the surface of the ground 12 penetrating various formations. This well has been cased with casing 13 which is held in place by cement 14. The logging apparatus in the well, indicated generally by numeral 15, is lowered to any desired depth by means of an insulated electric cable 16 which at the surface of the ground passes over a measuring sheave 17 and is coiled upon reel 18. In the particular apparatus shown in this figure, a two-conductor cable has been used, the surface ends of which are brought out to slip rings 19 mounted on an insulator 20 on the reel. Two brushes 21 and 22 insulated from the reel frame and carried thereon makes electric contact with the slip rings 19. A two conductor cable 23 connects the brushes with the recording apparatus 24. The diameter of the measuring sheave 17 is preferably made so that with each revolution an integral number of feet, for example 10 or 15 feet, on the electric cable 16 are measured off. As a result the number of revolutions of this measuring sheave can be used to determine the depth of the logging apparatus in the well. A flexible cable 25 is driven by the rotation of the measuring sheave and in turn drives a logging chart in the recording apparatus 24 so that indications made on this chart can be correlated with the depth of the logging apparatus 15 in the well. Electrical synchronizing apparatus such as "Selsyn" motors may be used, as is well known in the art, in case the sheave 17 is too distant from the recording apparatus 24 for direct mechanical coupling to be used.

The recording apparatus 15 includes a watertight case 26 within which an ionization chamber 27 is firmly mounted. Two leads 28 which are brought out from the electrodes of the ionization chamber are connected to the electric apparatus in a container 29 mounted in the case. This equipment is shown in more detail in Figure 2. The output from the apparatus in container 29 is transmitted over the two insulated conductors 48 in the logging cable 16 to the surface where it is recorded.

If the radioactivity of the formations is relatively low so that the log shows little detail, a radioactive material or other source of penetrating radiation 30 may be placed within the case, the radiation from which produces secondary radioactivity from the formations which affects the ionization chamber 27. In case the radioactivity of the formations is sufficient to produce a detailed log, there is no need of employing this radioactive material 30. In case such material is used sufficient shielding material must be used between it and the ionization chamber 27 to insure that the direct ionization of chamber 27 by the material is negligible.

One arrangement of apparatus in the container 29 is shown in Figure 2 along with the connections to the ionization chamber and to the logging cable. The ionization chamber 27 preferably consists of an outer case 31 which can advantageously be made of metal and which carries two insulators 32 (for example, spark plugs) through which pass the leads 28. The case is made air-tight and is filled with the inert gas such as nitrogen at a superatmospheric pressure, for example 300 pounds per square inch. Within the case 31 are mounted two insulated electrodes 33 and 34. Electrode 33 is preferably a metal cylinder coaxial with electrode 34. A condenser 35 is connected across the two electrodes 33 and 34 in such a manner that the electrode 34 is positive with regard to the electrode 33. Condenser 35 is repeatedly and intermittently charged to a high potential, for example 300 to 1000 volts, from a battery 36 or other source of direct potential. As shown in Figure 2, the battery 36 is connected through a resistance 37 across a condenser 38. This condenser 38 is repeatedly and intermittently connected in parallel with condenser 35, for example by the operation of a gas discharge tube or Thyratron 39 (a vacuum triode can also be used) in order to charge condenser 35 approximately to the potential of battery 36. The filament of this Thyratron is heated from a battery 40 or the like.

The repeated and intermittent periodic recharging of condenser 35 by means of gas discharge tube 39 is governed by the operation of a thermionically controlled relay including vacuum tube 41. The filament of this tube is heated with a battery 42 or the like. The grid of this tube is connected to the plate of gas discharge tube 39 through a grid bias battery 43. It is apparent from the wiring diagram that the potential between filament and grid of vacuum tube 41 increases in a positive direction as the discharge of condenser 35 continues so that the plate current of vacuum tube 41 correspondingly increases. When the cathode voltage on vacuum tube 41 reaches a predetermined value the plate current which flows through the coil of relay 44 is sufficient to close the contacts of this relay. This short circuits the negative grid bias on the gas discharge tube 39 which was previously supplied by battery 45 and resistance 46. As soon as this grid potential is shorted out, the gas discharge tube 39 or Thyratron is actuated and since the resistance across this tube is now a very low value, the positive side of condenser 38 is connected to the positive side of the potential discharge condenser 35 recharging it to the initial value. As soon as the potential of the two condensers is approximately equal the discharge through the gas discharge tube 39 ceases. At this point the grid potential of vacuum tube 41 is again negative, the plate current of that tube accordingly is substantially zero, the contacts of relay 44 open and a negative grid bias is restored on gas discharge tube 39, thus completing the cycle. The whole circuit is adapted to discharge the condenser through the ionization chamber and periodically recharge said condenser whenever the condenser potential drops to a predetermined minimum value. The time between periodic chargings varies, therefore, depending upon the resistance of the ionization chamber and will be higher whenever there is very little penetrating or gamma radiation coming from the formations and low when the reverse is true.

Figure 6:
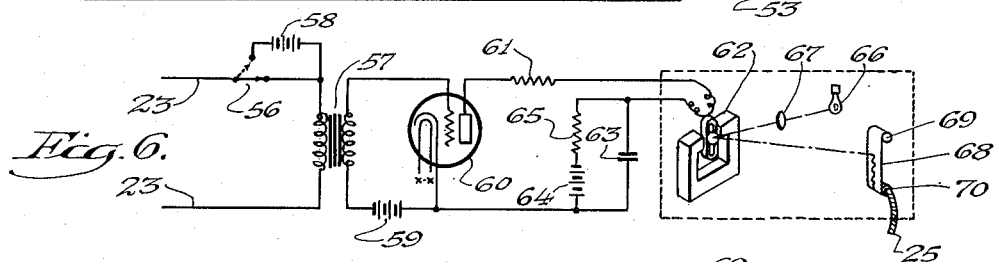
Figure 6 is a wiring diagram of apparatus used to record the signal proportional to the radioactivity in the well.

A vacuum tube amplifier 47 is connected across the grid and cathode of the gas discharge tube 39. The output of this amplifier therefore varies in the same periodic manner as does the grid cathode potential. The frequency of the pulses, i. e. the number of pulses per unit time coming from the amplifier, is directly proportional to the rate of discharge of the ionization chamber, being high when the penetrating radiation is great and low when this radiation is slight. The output of the amplifier is connected to the two leads 48 in the logging cable 16 for transmission to the surface. Preferably the output of this amplifier is at a relatively low resistance of a value of a few thousand ohms so that a variation in the leakage resistance between the two well conductors 48 which customarily varies between a few meghoms and some tens of thousands of ohms has a relatively negligible effect upon the signal. At the surface the recorder 24 is equipped to produce an indication proportional to the number of pulses per unit time received without regard to the amplitude of these pulses. One satisfactory circuit for accomplishing this result is shown in Figure 6 which is subsequently described.

An alternative arrangement of apparatus for use in the case 29 is shown in Figure 3. In this figure the ionization chamber is shown diagrammatically but it is to be understood that the construction is such that the case 31 is air-tight and contains inert gas at a super-atmospheric pressure. In this wiring diagram the grid potential on the vacuum tube 41 is obtained by connecting this grid through a battery 43', the potential of which is somewhat less than that of battery 36, to the negative plate of condenser 35. As the condenser 35 discharges to a predetermined potential approximating that of battery 43', the negative potential on the grid of tube 41 falls from a high value to a value only slightly negative with respect to the cathode whereupon sufficient plate current flows through the coil of relay 44 to close the relay contacts thus actuating the gas discharge tube 39, charging condenser 35 from condenser 38 to its initial value. The grid voltage on tube 41 is then highly negative, cutting off the relay current.

The amplifier 49 is shown connected across the filament to the plate of the gas discharge tube 40 so that voltage across the amplifier input is equal to the difference of potential of battery 36 and condenser 35, thus being zero when condenser 35 is fully charged and having a predetermined maximum value just at the instant at which the relay contacts on relay 44 close. The voltage applied to the input of amplifier 49 is plotted against time in Figure 4. It is seen that the maximum difference in potential is a constant but that the time of the various pulsations decreases as the discharge rate of condenser 35 is increased due to increased ionization in chamber 27. Therefore the frequency of the pulses in the output of this amplifier 49 across the logging cable conductors 48 increases as the penetrating radiation increases. At the surface a frequency responsive device such as that shown in Figure 6 is used to produce an indication which, being proportional to the frequency of the pulses, is therefore proportional to the response of ionization chamber 27 or the penetrating radiation.

In Figure 5 I have shown a wiring diagram of equipment useful not only to determine the radioactivity of the various formations in the well but also means by the use of which it is possible to determine the response of the logging equipment to the output of the ionization chamber so that it is possible to calibrate the equipment in the well. In order to accomplish this result I substitute by means of a relay actuated from the surface a resistance of the same order of magnitude as that of the ionization chamber, the characteristics of which are known, and determine the response of the logging system to this resistance. In other words, I substitute a dummy ionization chamber for the actual ionization chamber on making this check. The switch for changing from the ionization chamber 27 to the calibrating resistance 50 is made up of two diode rectifier tubes 51 and 51'. The plate of diode 51 is connected to one of the electrodes 33 in the ionization chamber 27. The cathode of this diode 51 is connected to the negative side of the battery 36 through the charging resistance 37. The cathode of the other diode 51' is similarly connected. The plate of the second diode 51' is connected to one side of the calibrating resistance 50, the other side of which is connected to the electrode 34 of the ionization chamber 27 to which the plate of the diode 51 is not connected. A single pole, double throw relay 52 is connected in series with a filament battery 53 or a similar source of potential by means of which the filaments of the two diodes are alternately energized depending upon whether there is current in the energizing coil of the relay 52. When no current is flowing through the relay coil the relay switch is closed to heat the cathode of the diode 51, the plate of which is connected to the ionization chamber. Under this condition there is a relatively low impedance path through the tube connecting the electrode 33 of the ionization chamber to the negative pole of the charging condenser 38. When the coil of relay 52 is energized, the relay switch is thrown in the opposite direction and the cathode of diode 51' is heated while the cathode of tube 51 is deenergized. This produces a low impedance drop across the second diode 51' which connects the calibrating resistance in place of the ionization chamber 27. The discharge condenser 35 is connected across the ionization chamber or the calibrating resistance, depending on which diode is energized. A double diode can be employed instead of the two diodes 51 and 51' if it has separately energizable cathodes.

The circuit for repeatedly and intermittently charging the condenser 35 when the potential across it decreases below a predetermined value is the same as that shown in Figure 2 previously described. The output of the amplifier 47 is connected across a transformer 53 so that the pulses proportional to the response of the charging system to the ionization chamber or the calibrating resistance can be transmitted through conductors 48 to the surface. Two leads 54 are connected across the conductors 48. These connect the coil of relay 52 to the conductors 48 through a choke coil 55, the impedance of which is high compared to that across the conductors 48 so that the shunting action of this circuit is inappreciable. At the surface of the ground the conductors 48 are connected to the leads 23 as shown in Figure 6. In one of the leads 23 is connected a single pole, double throw switch 56 which in one position connects the leads 23 directly across the primary of the input transformer 57 of the recording apparatus. In the second position the switch 56 connects a relay battery 58 in series with the primary of transformer 57 thus producing a direct current voltage across leads 23. At the logging apparatus in the well this direct potential is applied through leads 23, and conductors 48 across the energizing coil or relay 52 closing the switch of the relay in the opposite direction. Thus whenever the operator draws switch 56 in the up position as indicated by the broken line in Figure 6, the relay 52 is energized and the calibrating resistance 50 is substituted for the ionization chamber in the logging apparatus. With the equipment shown in Figures 5 and 6, the number of pulses per unit time is the quantity being recorded so that it makes very little difference as to what the leakage across conductors 48 happens to be. It follows that the slight direct current flowing through the transformers 53 and 57 will not affect the number of pulses and hence will not interfere with the calibration. The operator can thus calibrate the apparatus at will when the ionization chamber is at any particular point in the well. If desired, an isolating condenser 48' can be connected in one lead 48 as shown by the dotted lines in Figure 5, to keep the direct current out of transformer 53.

In Figure 6 is also shown one means of indicating the number of pulses per unit of time which arrive at the surface. The secondary of transformer 57 is connected through a grid bias battery 59 between grid and cathode of a gas discharge tube or Thyratron 60, the filament of which is energized by placing a suitable source of potential across the points x—x. The plate of this tube 60 is connected through a resistance 61 to the coil of a ballistic type recording galvanometer 62, the other side of which is connected to the positively charged terminal of a condenser 63. The negative side of this condenser 63 is connected to the cathode of the tube 60. Across condenser 63 is also placed a charging circuit consisting of a battery or other source of direct potential 64 and a charging resistance 65. The Thyratron 60 is non-conducting until a pulse from the conductors 23 is applied between cathode and grid. At this point the tube is activated and condenser 63 discharges through the tube producing a single current pulse the magnitude of which is independent of the input signal but dependent upon the characteristics of condenser 63, resistance 61 and gas discharge tube 60. This current pulse deflects the coil of the recording ballistic galvanometer 62. As soon as the voltage pulse across lines 23 has ceased and the condenser 63 has discharged the tube becomes non-conducting and is therefore restored to the initial condition. Thereafter condenser 63 is recharged through the battery 64 and charging resistance 65. Resistance 65 is large enough so that battery 64 cannot keep the gas discharge tube 60 from returning to the non-conducting state after the major part of the discharge of condenser 63 has occurred. Each voltage pulse across the leads 23 thus produces the same current pulse through the coil of the galvanometer 62 so that the number of these pulses per unit time determines the deflection of this coil. In order to accomplish this the period of the ballistic galvanometer coil is chosen to be considerably greater than the greatest interval of time between pulses coming from the apparatus in the well. The deflection of the galvanometer coil 62 is recorded in the customary manner by illuminating a small mirror on the coil from a lamp 66, the rays of which are concentrated by a lens 67 to focus as a spot on the photosensitive film 68 in the light tight recording apparatus. This photosensitive film is unrolled from a supply spool 69 and rolled onto a receiving reel 70 by means of the connection 25 between the measuring sheave and the receiving reel. The resultant record 68 is developed and fixed after the logging operations have been concluded in order to produce the desired radioactivity log. Preferably but not necessarily indications are printed on the photosensitive material 68 for each ten feet of difference of elevation of the logging equipment in the well. Apparatus to accomplish this function has been described in many places in the literature so no further description of this equipment is given herein.

It is apparent from inspection of Figure 6 that the apparatus used to record the number of pulses coming from the logging aparatus in the well per unit time is a recording frequency meter. Other types of recording frequency meters have been described in the technical literature and may be used if desired instead of that described in Figure 6. In light of this description it can be seen that when the pulses applied to the input of the recording circuit are as shown in Figure 4, that the deflection of the galvanometer coil 62 varies from a large deflection to a small deflection twice during the time intervals shown in Figure 4.

When the operator throws the switch 56 into the up position so that the calibrating resistance 50 is substituted for the ionization chamber 27, the number of pulses coming from the well is constant since the resistance 50 is constant. The comparison of the pulse rate under this condition with that when the ionization chamber is being used in the circuit indicates to the operator the response of the charging circuit to the ionization chamber and hence calibrates the system in terms of the sensitivity of the ionization chamber, and makes immediately evident any change or drift in any of the elements of the circuit.

Figure 7:
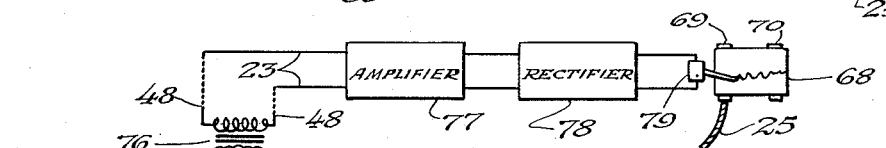
Figure 7 is a simplified wiring diagram of an alternative embodiment of this invention.
Figure 8:
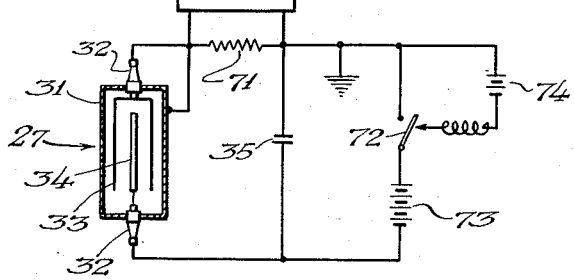
Figure 8 is a graph of the voltage-time relationship of the signals produced in the well by the apparatus shown in Figure 7.

While I prefer to operate the radioactivity logging system in the manner described above; namely, with the charging circuit operating at a rate dependent upon the radiation impinging on the ionization chamber, it is also possible to obtain the desired indication by recharging the condenser at fixed intervals of time, as shown in Figure 7. In this figure the discharge condenser 35 is connected across ionization chamber 27 through a resistance 71. Current will flow through resistance 71 proportional to the ionization in the ionization chamber and thus discharge condenser 35. At substantially equal intervals of time a synchronous switch 72 closes a battery 73 across the condenser, recharging it to the initial potential. The buzzer 72 is actuated by a small auxiliary battery 74. This arrangement is similar to that used to actuate a doorbell. The frequency is usually much lower than that of the doorbell, however. If the penetrating radiation impinging on the ionization chamber 27 is low there will be little discharge of the condenser 35 between charging periods and accordingly the drop across resistance 71 will be small. If, on the other hand, the ionization is relatively intense, this drop will be large. A typical plot of the potential across resistance 71 against time is shown in Figure 8 in which it will be seen that at the left part of the figure where the ionization is relatively large, the difference in potential between the full voltage of condenser 35 and the discharge voltage is great, whereas a short time later when the ionization has decreased by movement of the logging apparatus in the well, the pulsating current flowing through resistance 71 is much smaller. This pulsating voltage is amplified in an amplifier 75, the input of which is connected across resistance 71. The output of this amplifier is connected, for example, by means of a transformer 76 across the logging cable conductors 48 by which it is transmitted to the surface. The conductors 48 are connected as shown in Figure 1, to the leads 23 from which the signal preferably passes into the input of a second amplifier 77 for further amplification. If desired all of the amplification can be accomplished by means of amplifier 75 in which case amplifier 77 is not needed. The output of the amplifier 77 is rectified by rectifier 78 to produce a direct potential, the magnitude of which is proportional to the amplified signal pulses coming from the well apparatus. The output from the rectifier 78 actuates a recording galvanometer 79 which may be a direct curve drawing instrument such as shown in Figure 7 or which can be a well damped coil galvanometer element or oscillograph in which case beam-of-light recording system is used as shown in Figure 6. In either case, the indication is recorded on a chart 68 which is drawn past the point of recording preferably by means of the connection 25 to the measuring sheave 17. The transformer 76 is preferably arranged to work into an impedance which is much lower than the leakage resistance across the cable 48. Accordingly the leakage of this cable has very little effect on the amplitude of the resultant signals. There is also an advantage in this arrangement of apparatus over that shown in the prior art in that there is no mechanical disturbance of the equipment connected to the ionization chamber.

The same sort of calibrating circuit shown in Figure 5 can be used in connection with Figure 7. If such an arrangement is used, the amplitude of the signal obtained when the calibrating resistance 50 is substituted for the ionization chamber 27 is noted by the operator and used in precisely the same manner as that described in connection with Figure 5.

The invention which has been described in connection with the various embodiments is capable of wide application. There is no need for one skilled in the art to limit himself to the particular circuits shown and described. These embodiments have been selected merely for the purpose of illustration and the invention is best described in the appended claims.

I claim:

1. A method of determining the radioactivity of the material forming the walls of a well including the steps of lowering into said well to each of a plurality of known depths an ionization chamber containing an inert gas at superatmospheric pressure and at least two insulated electrodes, intermittently discharging a charged condenser through said electrodes adjacent said chamber, said discharge varying in accordance with the radioactivity of said material, recharging said condenser to a predetermined maximum potential after each such discharge, producing a pulsating electric signal by said intermittent charging and discharging of said condenser, one characteristic of which varies with said intermittent discharge through said electrodes, and measuring the variation in said characteristic of said signal as said chamber is lowered to each of said known depths.

2. A method of determining the relative radioactivity of various formations adjacent a well including the steps of lowering into said well to each of a plurality of known depths an ionization chamber containing an inert gas at superatmospheric pressure and two insulated electrodes, discharging at each of said depths a charged condenser through said two electrodes, recharging said condenser to a predetermined maximum potential whenever the potential of said condenser drops to a predetermined minimum value, producing a pulsating signal in synchronism with said charging and discharging steps, transmitting said signal to the surface of the earth, and producing and recording at the surface of the earth an indication proportional to the number of pulses of said signal per unit time at each of said depths of said ionization chamber in said well.

3. In a method of determining the relative radioactivity of various formations adjacent a well including lowering into said well an ionization chamber responsive to the radioactivity of said formations, producing by an electric circuit connected to said chamber a pulsating signal a characteristic of which varies directly with the response of said chamber to said radioactivity, and recording against the depth of said ionization chamber in said well a quantity proportional to the magnitude of said characteristic, the improvement which comprises substituting at the will of the operator a resistance of known characteristics for said ionization chamber in said electric circuit, whereby the response of said electric circuit to the output of said ionization chamber can be determined.

4. A method of logging a cased well including the steps of lowering into said well to each of a plurality of known depths an ionization chamber responsive to penetrating radiation emanating from formations adjacent said well, and at each such depth partially discharging through said chamber a charged condenser, recharging said condenser at substantially equal intervals, producing a pulsating signal proportional to the change of potential across said chamber due to said discharging step, amplifying said signal and recording an indication proportional to the magnitude of said signal.

5. A method according to claim 4, including the step of temporarily substituting at the will of the operator a resistance of known magnitude for said ionization chamber, whereby said magnitude of said indication during the substituting step furnishes an indication of the sensitivity of said pulsating signal production step.

6. Apparatus for determining the radioactivity of the material forming the walls of a well including an ionization chamber adapted to be lowered into said well, said ionization chamber including a case, at least two electrodes within and insulated from said case, and an inert gas filling said chamber at superatmospheric pressure, a condenser, means for repeatedly and intermittently charging said condenser to a fixed maximum voltage, means for discharging said charged condenser through said electrodes of said chamber after each such charge, said discharge varying in accordance with the radioactivity of said material adjacent said chamber, means for producing a pulsating electric signal proportional to said alternate charging and discharging of said condenser, one characteristic of said signal being proportional to the repeated discharging of said condenser through said electrodes, means for measuring the variation in said characteristic of said signal as said ionization chamber is located at each of a plurality of depths in said well, and means for determining the depth of said chamber in said well.

7. Apparatus for the measurement of the relative radioactivity of formations forming the walls of a well including an ionization chamber adapted to be lowered into said well, said ionization chamber containing two electrodes insulated from each other, a condenser connected across said electrodes, means for charging said condenser to a relatively constant maximum potential whenever the potential of said condenser decreases below a predetermined value, an amplifier connected to said condenser and said charging means adapted to produce a signal pulse for each charging of said condenser, an electric cable connected to said amplifier and adapted to lower said ionization chamber, charging means, condenser and amplifier into said well, means connected to said cable and responsive to said pulsating signal for recording an indication proportional to the number of pulses of said signal per unit of time, and means for ascertaining the depth of said ionization chamber in said well.

8. Apparatus according to claim 7 including a resistance and means for temporarily substituting said resistance for said ionization chamber while said ionization chamber is in said well.

9. Apparatus for the measurement of the relative radioactivity of formations forming the walls of a well including an ionization chamber containing two electrodes insulated from each other, a condenser connected across said electrodes, means for periodically charging said condenser to a relatively constant maximum potential at substantially equal intervals of time, an amplifier adapted to produce a pulsating signal proportional to the difference between said condenser potential and said maximum potential, an electric cable connected to said amplifier and adapted to lower said ionization chamber, charging means, condenser and amplifier into said well, rectifying means responsive to said pulsating signals adapted to produce a direct potential in proportion to the amplitude of said pulsating signals, means for determining the depth of said ionization chamber in said well and means for recording a quantity proportional to said direct potential against the depth of said ionization chamber in said well.

10. Apparatus according to claim 9 including a resistance, and manually controllable means for substituting said resistance for said ionization chamber while said ionization chamber is in said well.

11. Apparatus for the measurement of the relative radioactivity of formations forming the walls of a well including an ionization chamber containing two electrodes insulated from each other, a condenser connected across said electrodes, means for actuating a relay whenever the potential of said condenser decreases below a predetermined value, a second condenser maintained at a high potential, means including a gas discharge tube responsive to said actuation of said relay for charging said condenser from said second condenser, an amplifier connected between said condenser and said second condenser whereby said amplifier is responsive to the difference between said condenser potential and the potential of said second condenser, an electric cable connected to said amplifier and adapted to lower said above-mentioned apparatus into said well, means coupled to the other end of said cable including a second gas discharge tube adapted to produce a single pulse of current during each cycle of charge and discharge of said condenser, and means for recording a quantity proportional to the number of said current pulses per unit interval of time on a recording medium moving at a rate proportional to the rate of lowering said ionization chamber in said well.

DANIEL SILVERMAN.